Figure 1:
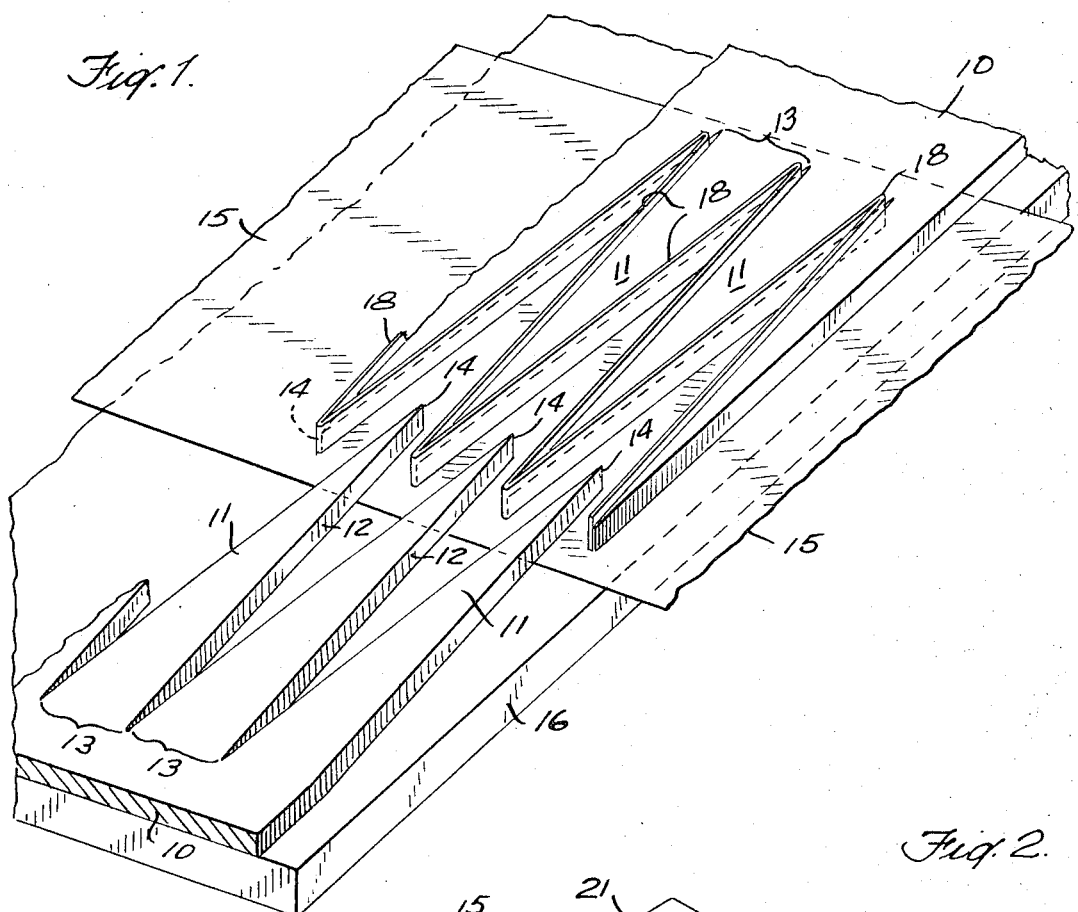

Jan. 31, 1967  T. I. READ  3,300,826
CONVEYOR BELT AND METHOD OF JOINTING SAME
Filed May 8, 1964

INVENTOR
THOMAS I. READ
BY
ATTORNEY

United States Patent Office 3,300,826
Patented Jan. 31, 1967

3,300,826
CONVEYOR BELT AND METHOD OF
JOINTING SAME
Thomas Irvin Read, Portland, Conn., assignor to The
Russell Manufacturing Company, Middletown, Conn.,
a corporation of Connecticut
Filed May 8, 1964, Ser. No. 365,946
4 Claims. (Cl. 24—38)

This invention relates to a method for jointing the ends of conveyor belts or the like and to conveyor belts having their ends so jointed.

An object of the invention is to provide a simple and improved method for jointing the ends of conveyor belts composed essentially of fabric reinforced plastic material.

Another object is to provide a method of the above type which can be readily carried out in the field.

Another object is to provide a conveyor belt joint having improved wear characteristics.

Various other objects and advantages will be apparent as the nature of the invention is more fully disclosed.

The invention will be better understood from the following description taken in connection with the accompanying drawing in which a specific embodiment has been specifically set forth for purposes of illustration.

Figure 2:
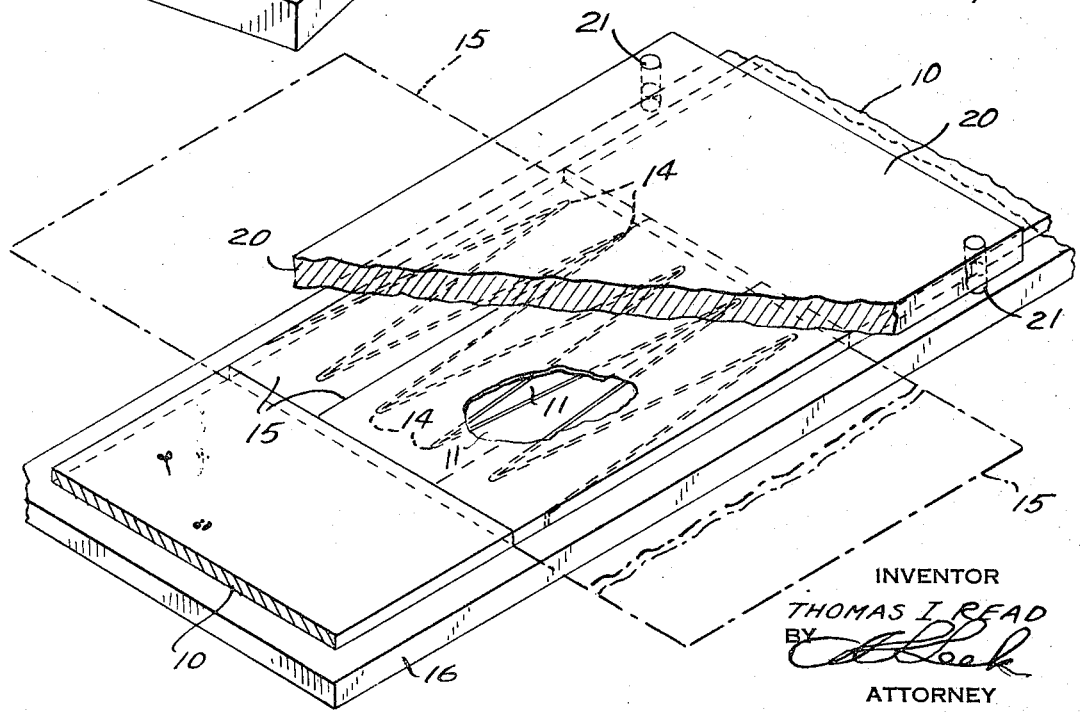

In the drawing:

FIG. 1 is a perspective view illustrating a preliminary stage in the process for jointing the ends of a conveyor belt; and FIG. 2 is a similar perspective view partly broken away showing the finished joint.

Referring to the drawing more in detail, the ends 10 of a conveyor belt or the like composed of fabric reinforced plastic material are first cut to provide a series of interleaved fingers 11 which extend entirely across each of the ends of the belt. These fingers are preferably so proportioned that the side edges 12 of the fingers extend at an angle of not over 3° with respect to the side edges of the belt. For example, the fingers may taper forming base 13 having a width of approximately 2" to a point 14 and may have a length of the order of 17" to 19" depending upon the thickness of the belt and the width of the belt.

For forming the joint, a strip 15 of fabric such as nylon impregnated with a bonding thermoplastic resin such as polyvinyl chloride paste is first laid across a plate 16 which constitutes one of the clamping elements. This strip 15 is of a width greater than the maximum length of the fingers 11 and is of a length to provide an overlap when folded around the belt. The two ends 10 of the belt are then laid on the plate 16 with their fingers 11 partially interleaved and extending over the surface of the strip of fabric 15. The fingers are preferably interleaved to a point such that a small gap is provided between adjacent surfaces of the respective fingers.

A tape 18 of a thermosetting bonding material is then inserted by hand in the space between adjacent fingers. The tape thus extends along the edges of the fingers from one side of the belt to the other. This tape may be composed of a plastic composition of polyvinyl chloride and nitrile rubber containing a suitable plasticizer and suitable vulcanizing agents and is adapted when heated to a vulcanizing temperature to form a bonding composition which is capable of bonding the contacting edges of the fingers together and of providing a sufficient shear strength to impart to the joint thus formed a tensile strength up to 81% of the tensile strength of the remainder of the belt.

Prior to inserting the strip 18 the side edges 12 of the fingers may be coated with a polyvinyl chloride paste so as to help fuse and solidify the total bonding components. After the fingers have been so treated and the strip 18 has been positioned between the contiguous surfaces thereof, the two ends of the belt are brought together so as to close the space between the adjacent fingers and make firm contact between the edges of the fingers and the polyvinyl chloride tape 18. The fabric strip 15 is then folded over the top surface of the fingers 11 with its ends 19 overlapping and a top plate 20 is placed over the fingers 11 and strip 15 to clamp the ends of the belt firmly against the underplate 16. Stop members 21 may be provided to limit the compression of the plate 20 to approximately the thickness of the belt so that the belt will not be deformed due to the clamping pressure. However, sufficient pressure is applied to cause the surface of the fabric strip 15 to conform substantially to the outer surface of the belt so that the belt is of uniform total thickness throughout. The clamped assembly is then placed in a portable vulcanizer and vulcanized at a temperature of, for example, 320° F. for a period of some 15 minutes at which temperature complete vulcanization of the polyvinyl chloride-nitrile rubber bonding material takes place. The vulcanized joint is then removed from the portable vulcanizer and the assembly allowed to cool to a setting temperature of, for example, 175° F. before the top plate 20 is removed. The joint is then complete and ready for use.

It will be found that the joint thus produced possesses a high tensile strength due to the nature of the bonding agent and also due to the construction of the joint including the fabric strip which covers the surfaces of the fingers and also covers and protects the edges of the belt. This strip has been firmly bonded to the fingers themselves and also to the bonding medium in the spaces between the adjacent fingers so that it becomes an integral part of the belt and prevents the points of the fingers from being displaced and loosened under the severe conditions of use to which the belt is ordinarily subjected. The fabric strip also protects the fingers at the two edges of the belt which are normally in the most vulnerable position to be dislodged. The joint is sufficiently flexible to avoid any difficulty in passing around belt pulleys and at the same time does not produce an area of increased thickness which would in itself cause the belt to wear in the area of the joint.

The clamping pressure to which the belt is subjected during vulcanizing should be sufficient to cause the bonding material to flow and fill the spaces between the fingers and to cause the fabric strip 15 to be compressed into the surface of the belt but not sufficient to cause deformation of the belt itself which might otherwise occur due to the softening of the plastic composition of the belt at the vulcanizing temperature. Obviously the nature of the bonding composition must be such that the composition is compatible with the plastic material of the belt. The bonding material has been found suitable for belts wherein the plastic composition comprises a natural or synthetic rubber or a thermoplastic composition which is capable of retaining its form at the vulcanizing temperature of the polyvinyl chloride—nitrile rubber bonding composition.

What is claimed is:

1. A belt composed of fabric reinforced plastic material having at its ends interleaved fingers extending entirely across the width of said belt, said fingers having side edges bonded by a polyvinyl chloride tape and a fabric strip extending around the area of said interleaved fingers to cover the surfaces of said fingers and the edges of said belt, said fabric strip having a polyvinyl chloride coating bonded to said fingers and to said tape.

2. A belt as set forth in claim 1 wherein said fabric strip is wrapped around said interleaved fingers with its ends overlapped for completely enclosing and bonding the same.

3. The method of bonding the ends of a belt composed of fabric reinforced plastic material and having at its ends interleaved fingers extending entirely across the belt characterized by partially interleaving said fingers to form a space between adjacent edges thereof, disposing in said space a tape composed of polyvinyl chloride and a vulcanizable carrier, bringing the ends together to close said space with the tape engaging the edges of adjacent fingers, wrapping the belt in the area of said fingers with a fabric strip impregnated with a polyvinyl chloride paste to cover the top and bottom surfaces of said fingers and completely enclose the same and subjecting said area to a vulcanizing temperature under a pressure to cause said fabric strip and said tape to bond together and to the side edges and top and bottom surfaces of said fingers so that each finger is completely enclosed in and bonded to the vulcanized material.

4. The method set forth in claim 3 in which the vulcanizing step is carried out under a pressure adapted to cause the surface of said fabric strip to conform substantially to the surface of said belt.

References Cited by the Examiner

UNITED STATES PATENTS

| | | | |
|---|---|---|---|
| 66,261 | 7/1867 | Smith | 24—38 |
| 1,442,922 | 1/1923 | Bradshaw | 74—231 X |
| 1,474,774 | 11/1923 | Fuller | 24—38 |
| 1,706,367 | 3/1929 | Tolman | 24—38 |
| 2,060,906 | 11/1936 | Snyder. | |
| 2,135,057 | 5/1943 | Slayter et al. | 74—231 |
| 2,318,287 | 5/1943 | Brolin | 156—157 X |
| 2,547,220 | 4/1951 | Merrill | 74—232 |

FOREIGN PATENTS 761,758 11/1956 Great Britain.

DAVID J. WILLIAMOWSKY, *Primary Examiner.*

J. A. WONG, *Assistant Examiner.*